United States Patent
Suzuki et al.

(10) Patent No.: US 11,306,008 B2
(45) Date of Patent: Apr. 19, 2022

(54) WORKING MEDIUM AND WATER TREATMENT SYSTEM

(71) Applicant: KABUSHIKI KAISHA TOSHIBA, Minato-ku (JP)

(72) Inventors: Akiko Suzuki, Tokyo (JP); Toshihiro Imada, Kawasaki (JP); Kenji Sano, Inagi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 17/007,573

(22) Filed: Aug. 31, 2020

(65) Prior Publication Data

US 2021/0292194 A1  Sep. 23, 2021

(30) Foreign Application Priority Data

Mar. 19, 2020 (JP) .............................. JP2020-048648

(51) Int. Cl.
*C02F 1/44* (2006.01)
*B01D 61/00* (2006.01)
*C02F 103/08* (2006.01)

(52) U.S. Cl.
CPC ............ *C02F 1/445* (2013.01); *B01D 61/005* (2013.01); *C02F 2103/08* (2013.01); *C02F 2201/002* (2013.01)

(58) Field of Classification Search
USPC ....................................................... 210/676
See application file for complete search history.

(56) References Cited

U.S. PATENT DOCUMENTS

| 10,195,543 B2 * | 2/2019 | Wilson | B01D 67/0093 |
| 10,363,336 B2 * | 7/2019 | Wilson | B01D 61/005 |
| 2006/0144789 A1 * | 7/2006 | Cath | B01D 61/58 210/641 |

(Continued)

FOREIGN PATENT DOCUMENTS

| JP | 2012-170954 A | 9/2012 |
| JP | 2015-098833 A | 5/2015 |

(Continued)

OTHER PUBLICATIONS

Christopher J. Orme et al., "1-Cyclohexylpiperidine as a Thermolytic Draw Solute for Osmotically Driven Membrane Processes", Desalination 371 (2015), pp. 126-133.

(Continued)

*Primary Examiner* — Nina Bhat
(74) *Attorney, Agent, or Firm* — Oblon, McClelland, Maier & Neustadt, L.L.P.

(57) ABSTRACT

A working medium includes a first amine compound and a second amine compound. The first amine compound is a heterocyclic tertiary amine compound including a carbon atom, a nitrogen atom and a hydrogen atom, and in which a ratio (C/N ratio) of a carbon atom number to a nitrogen atom number included in one molecule is from 7 to 9. The second amine compound is a heterocyclic tertiary amine compound including a carbon atom, a nitrogen atom and a hydrogen atom. and in which a ratio (C/N ratio) of a carbon atom number to a nitrogen atom number included in one molecule is in a range of 5 or more to less than 7.

9 Claims, 4 Drawing Sheets

(56) References Cited

U.S. PATENT DOCUMENTS

| | | | |
|---|---|---|---|
| 2008/0058549 A1* | 3/2008 | Jessop | B01D 17/047 564/238 |
| 2010/0155329 A1* | 6/2010 | Iyer | C02F 1/445 210/636 |
| 2011/0203994 A1* | 8/2011 | McGinnis | B01D 61/005 210/650 |
| 2011/0257334 A1* | 10/2011 | Jessop | C08K 5/17 525/50 |
| 2012/0267308 A1* | 10/2012 | Carmignani | B01D 21/267 210/644 |
| 2013/0048561 A1* | 2/2013 | Wilson | B01D 61/58 210/637 |
| 2013/0256228 A1* | 10/2013 | Bharwada | C02F 1/445 210/644 |
| 2015/0135711 A1 | 5/2015 | Sano et al. | |
| 2015/0166363 A1* | 6/2015 | Eyal | B01D 61/025 210/652 |
| 2015/0249378 A1 | 9/2015 | Sano et al. | |
| 2015/0258507 A1 | 9/2015 | Sano et al. | |
| 2015/0273396 A1 | 10/2015 | Hancock et al. | |
| 2016/0016115 A1 | 1/2016 | Wilson et al. | |
| 2016/0152491 A1* | 6/2016 | Rajagopalan | B01D 65/02 210/644 |
| 2017/0136414 A1 | 5/2017 | Ide et al. | |
| 2017/0173532 A1 | 6/2017 | Ide et al. | |
| 2017/0182477 A1 | 6/2017 | Fuchigami et al. | |
| 2017/0025921 A1 | 9/2017 | Kanemaru et al. | |
| 2020/0255958 A1* | 8/2020 | Lister | C25B 11/032 |

FOREIGN PATENT DOCUMENTS

| | | |
|---|---|---|
| JP | 2015-161280 A | 9/2015 |
| JP | 2015-174028 A | 10/2015 |
| JP | WO2015/156404 A1 | 10/2015 |
| JP | 2016-504179 A | 2/2016 |
| JP | WO2016/027865 A1 | 2/2016 |
| JP | WO2016/072461 A1 | 5/2016 |
| JP | 2016-153114 A | 8/2016 |
| JP | 2017-113657 A | 6/2017 |
| JP | 2018-118186 A | 8/2018 |
| JP | 2018-158300 A | 10/2018 |
| JP | 2018-158303 A | 10/2018 |
| JP | 2020-044475 A | 3/2020 |
| WO | WO 2016/115497 A1 | 7/2016 |

OTHER PUBLICATIONS

Lam Phan et al., "Switchable Solvents Consisting of Amidine/ Alcohol or Guanidine/ Alcohol Mixtures", Ind. Eng. Chem. Res. 2008, 47, pp. 539-545.

Wilson et al., "Structure-function study of tertiary amines as switchable polarity solvents" RSC Adv., 4, 11039, 2014, 12 pages.

\* cited by examiner

WORKING MEDIUM AND WATER TREATMENT SYSTEM

CROSS-REFERENCE TO RELATED APPLICATIONS

This application is based upon and claims the benefit of priority from Japanese Patent Application No. 2020-048648, filed Mar. 19, 2020, the entire contents of which are incorporated herein by reference.

FIELD

Embodiments described herein relate generally to a working medium and a water treatment system.

BACKGROUND

When a solution having a low solute concentration and a solution having a high solute concentration are isolated from each other by an osmosis membrane, water of the low concentration solution permeates through the osmosis membrane and moves to the high concentration solution side. There is known a water treatment system which utilizes the phenomenon that the water moves. As an example of the water treatment system, there is a water treatment system which concentrates foods and sludge. At this time, the solution to be used on the higher concentration side is a working medium (draw solution), and various kinds of working mediums have been proposed so far.

Characteristics required for the working medium are, for example, a high separability from water, and a high polarity conversion rate. In general, when a working medium that is phase-separated from water is dissolved in water by a reaction with carbon dioxide ("polarity conversion"), there is a tendency that a working medium having a high concentration can be dissolved in water if a long time is consumed. However, there is a demand for preparing a high-concentration working medium in a shorter time.

DETAILED DESCRIPTION

According to an embodiment, a working medium is provided. The working medium includes a first amine compound and a second amine compound. The first amine compound is a tertiary amine compound which consists of a carbon atom, a nitrogen atom and a hydrogen atom, and in which the ratio (C/N ratio) of a carbon atom number to a nitrogen atom number included in one molecule is in a range of 7 or more to 9 or less, the tertiary amine compound including a plurality of heterocycles. The second amine compound is a tertiary amine compound which consists of a carbon atom, a nitrogen atom and a hydrogen atom, and in which the ratio (C/N ratio) of a carbon atom number to a nitrogen atom number included in one molecule is in a range of 5 or more to less than 7, the tertiary amine compound including a plurality of heterocycles.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

Hereinafter, water treatment systems of embodiments and working mediums to be used in the water treatment systems will be described.

First Embodiment

Figure 1:
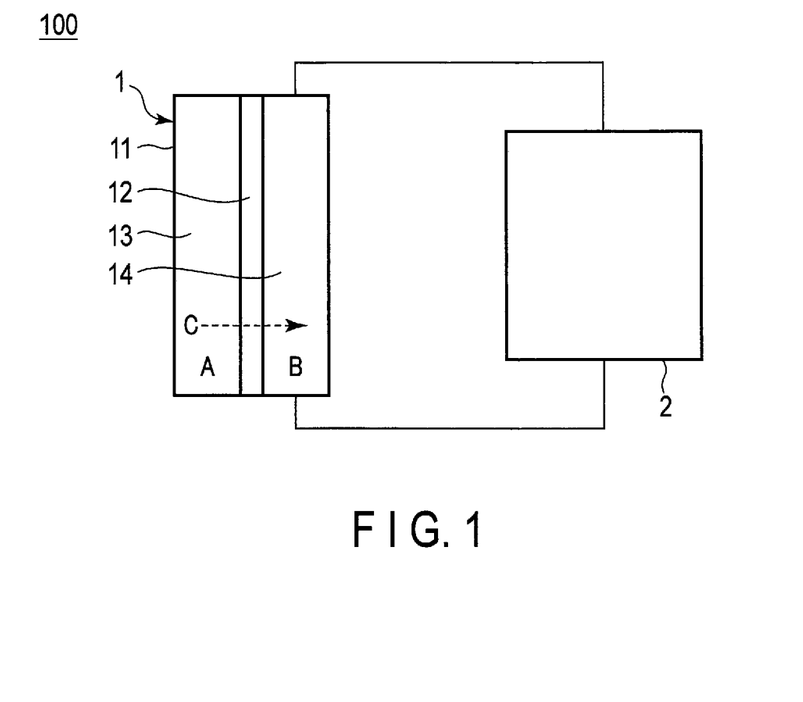
FIG. 1 is a view schematically illustrating an example of a water treatment system according to an embodiment.

FIG. 1 is a view schematically illustrating an example of a water treatment system according to an embodiment. A water treatment system 100 includes an osmotic pressure generator 1 and a concentrator 2. The osmotic pressure generator 1 includes a first chamber 13 which accommodates water to be treated A; a second chamber 14 which accommodates a working medium B; an osmosis membrane 12 which partitions the first chamber 13 and the second chamber 14; and a first treatment container 11 which accommodates the first chamber 13, second chamber 14 and osmosis membrane 12. The first treatment container is, for example, a resin or metal container.

The working medium B has a higher solute concentration than the water A to be treated. Therefore, the working medium B induces an osmotic pressure by an osmotic pressure difference occurring between the water A to be treated in the first chamber 13 and the working medium B in the second chamber 14. Water C included in the water A to be treated permeates through the osmosis membrane 12 and moves into the second chamber 14. As a result, the working medium B is diluted by the water C. The diluted working medium B moves to the concentrator 2, and the working medium B is concentrated by being separated into the working medium B and water.

The working medium B has affinity for water, which changes depending on the concentration of carbon dioxide included in the working medium B. Although the details of the working medium B will be described later, the working medium according to the embodiment includes an amine compound which includes a tertiary amino group. For example, when the concentration of carbon dioxide included in the working medium increases, the valence of the amine compound increases and the osmotic pressure is more easily induced. On the other hand, when the concentration of carbon dioxide in the working medium decreases, the valence of the amine compound decreases and the working medium and water are more easily separated. Therefore, the working medium becomes a medium exhibiting excellent osmotic pressure inducing property by decreasing the concentration of carbon dioxide in the working medium and separating the working medium and water and, thereafter, increasing, once again, the concentration of carbon dioxide in the working medium. In addition, it is possible to operate the water treatment at low cost since the process of changing the concentration of carbon dioxide in the working medium and the separation from water progress with low energy.

Absorption of carbon dioxide into the working medium B and release of carbon dioxide from the working medium B are performed in the concentrator 2. Since the working medium B, which is separated from water and concentrated, can be used once again for osmosis from the water A to be treated, the water treatment system according to the embodiment can perform multiple times of water treatment at low cost.

Note that there is a case in which water produced by the concentration of the working medium B contains an amine compound at a low concentration. This is the loss of an amine compound. In addition, the amine compound may be an impurity of water produced by the concentration of the working medium. B when the object of water treatment is desalination. Hence, when water produced by the concentration of the working medium B contains an amine compound at a low concentration, the water produced by the concentration of the working medium B is treated by using a reverse osmosis membrane separator to concentrate the liquid containing the amine compound, and thus a concentrated working medium B can be obtained and water separately produced can be obtained.

The osmosis membrane 12 may be, for example, a forward osmosis membrane (FO membrane) or a reverse osmosis membrane (RO membrane). A preferred osmosis membrane is a forward osmosis membrane.

As the osmosis membrane 12, for example, a cellulose acetate membrane, a polyamide membrane, or the like can be used. The osmosis membrane preferably has a thickness of 45 μm or more and 250 μm or less.

The first chamber 13 is a region in the first treatment container 11 which accommodates the water A to be treated. The second chamber 14 is another region in the first treatment container 11 which accommodates the working medium B. Although no illustrated, the first chamber 13 may be provided with an introduction path through which the water A to be treated is introduced, and a discharge path through which the water A to be treated is discharged.

The water A to be treated is a liquid having a lower solute concentration than the working medium B. Examples of the water A to be treated may include salt water (seawater and the like), lake water, river water, marsh water, domestic wastewater, industrial wastewater, or a mixture thereof. When the water A to be treated is salt water, the salt (sodium chloride) concentration of the salt water may be, for example, from 0.05% to 8%. The water A to be treated contains salts such as sodium chloride, magnesium chloride, magnesium sulfate, calcium sulfate, and potassium chloride and suspended substances. With water osmosing from the water A to be treated into the working medium B, substances other than water, which the water A to be treated includes, are concentrated.

The concentrator 2 includes a carbondioxide releasing unit which releases carbon dioxide from the working medium B, a phase separating unit which phase-separates the working medium B, and a carbondioxide introducing unit which causes the working medium B to absorb carbon dioxide. The concentrator 2 may further include a storage unit which stores the concentrated working medium B.

The carbondioxide releasing unit may be, for example, a warming device, an inert gas bubbling device, or the like. It is preferable to employ a heat exchanger utilizing exhaust heat as the warming device from the viewpoint of energy cost. The phase separating unit may be a three-phase separation type centrifugal separator. The carbondioxide introducing unit may be, for example, a carbon dioxide bubbling device. As the carbondioxide introducing unit, dry ice (solid carbon dioxide) may be added to the working medium. Carbon dioxide released by the carbondioxide releasing unit may be utilized as the carbon dioxide to be utilized in the carbondioxide introducing unit, or gas obtained by purifying carbon dioxide in the exhaust gas from a power plant using fossil fuel may be utilized.

When carbon dioxide is introduced into the working medium B, the temperature of the working medium B is preferably set at 80 degrees C. or lower. When the temperature is too high, carbon dioxide is released. On the other hand, when carbon dioxide is released from the working medium B, it is preferable that the working medium B is heated to a temperature lower than the boiling point thereof. Thereby, the release rate of carbon dioxide from the working medium B increases. The concentration of carbon dioxide in the working medium B when being introduced into the osmotic pressure generator 1 is 1 or more and 3 or less when the molar concentration of the working medium B is regarded as 1. The concentration of carbon dioxide introduced can be confirmed by $^{13}C$ quantitative NMR measurement of the working medium B. For the measurement, a double tube capable of isolating the deuterated solvent from the working medium B is utilized. The molar concentration ratio of the amount of carbon dioxide introduced to the amine compound contained in working medium B can be calculated from the integral value ratio of the peaks obtained.

When the concentration of carbon dioxide in the working medium B increases, the solubility of the amine compound in the working medium B increases and the working medium B becomes an aqueous solution. Meanwhile, when the concentration of carbon dioxide in the working medium B decreases, the solubility of the amine compound in the aqueous solution including working medium B decreases. The working medium B according to the embodiment may consist of only an amine compound, or may be a mixture including an amine compound and water.

The concentration of the working medium B is easy when the solubility of the working medium B including an amine compound greatly changes depending on the concentration of carbon dioxide in the working medium B. Hence, it is preferable to use an amine compound the solubility of which after absorption of carbon dioxide in water is four or more times the solubility of which after release of carbon dioxide in water.

When the working medium B, which became an aqueous solution, is phase-separated (polarity conversion), the working medium B may become in a solid-liquid separated state or a liquid-liquid separated state of the amine compound and water. Note that in the present specification, a phenomenon in which the amine compound and water are mixed into a homogeneous solution system is also referred to as "polarity conversion".

When the working medium B becomes in the solid-liquid separated state, it is possible to obtain a concentrated working medium B by recovering the solid by filtration or the like of the liquid and dissolving the solid in water. When the solid is dissolved in water, the solid becomes easily dissolvable, for example, by blowing carbon dioxide into the water and thus increasing the concentration of carbon dioxide in the water.

When the working medium B becomes in the liquid-liquid separated state, it is possible to obtain a concentrated working medium B by recovering the upper phase or the lower phase by using decantation, a separating funnel, or a liquid-liquid extractor and dissolving the phase containing an amine compound at a high concentration in water. At this time, the phase containing an amine compound at a high concentration becomes easily dissolvable in water, for example, by blowing carbon dioxide into the water and thus increasing the concentration of carbon dioxide in the water.

The working medium of the embodiment can generate a high permeate flux (Jw [L/m²h]) while keeping a low solute loss (Js [mmol/m²h]), when water C in the water A to be treated in the first chamber 13 permeates through the osmosis membrane 12 and moves into the second chamber 14 accommodating the working medium.

In the case of forward osmosis, a greater quantity of water can be osmosed from the water to be treated as the osmotic pressure of the working medium is higher. When carbon dioxide is present in an aqueous solution including a tertiary amine compound as a working medium, the tertiary amine compound (e.g. —NRR'), water and carbon dioxide react, and a protonated amine compound (—NH⁺RR') and bicarbonate ion ($HCO_3^-$) are produced. Here, the osmotic pressure π [atm] of the working medium can be estimated from the van't Hoff's equation: π=CRT. In the equation, C is a molar concentration [mol/dm³], R is a gas constant [atm·dm³/K·mol], and T is temperature [K]. When the molar concentration of the ionized amine compound and bicarbonate ion increases, the osmotic pressure π increases. Further, when the solute included in the working medium has an electric charge, it is advantageous that leakage (Js [mmol/m²h]) to the water to be treated is small.

The working medium of the embodiment includes a first amine compound, which is a tertiary amine compound, and a second amine compound, which is a tertiary amine compound. When the aqueous solution includes not the tertiary amine compound, but a primary amine compound and a secondary amine compound, a carbamate generation reaction of these amine compounds progresses quickly. The reason for this is that the reaction heat of the carbamate generation reaction is great. Therefore, great energy is needed in order to release carbon dioxide from the primary amine compound and secondary amine compound which are in the carbamate state.

On the other hand, the tertiary amine compound does not generate a carbamate. The reason for this is that there is no proton on an N atom which is necessary for generating a carbamate. There is an advantage that carbon dioxide can be released at low temperatures from the working medium which does not generate the carbamate and includes the protonated tertiary amine compound and bicarbonate ion. In short, the working medium can easily be concentrated.

The first amine compound consists of a carbon atom, a nitrogen atom and a hydrogen atom, the ratio (C/N ratio) of a carbon atom number to a nitrogen atom number in one molecule is in a range of 7 or more to 9 or less, and the first amine compound is a tertiary amine compound including a plurality of heterocycles. The second amine compound consists of a carbon atom, a nitrogen atom and a hydrogen atom, the ratio (C/N ratio) of a carbon atom number to a nitrogen atom number in one molecule is in a range of 5 or more to less than 7, and the second amine compound is a tertiary amine compound including a plurality of heterocycles. Since the C/N ratio of the first amine compound is in the range of 7 or more to 9 or less and the C/N ratio of the second amine compound is in the range of 5 or more to less than 7, the solubility (separability) of the first amine compound in water is similar to the solubility (separability) of the second amine compound in water. By mixing the first amine compound and the second amine compound, it is possible to achieve a high separation ratio and an improvement of a polarity conversion rate. If the number of heterocycles, which each of the first amine compound and second amine compound included in the working medium of the present embodiment includes, is two or more, the solubility (separability) in water can be made similar between the first amine compound and the second amine compound. The first amine compound and second amine compound may include the same number of heterocycles. When the number of heterocycles, which each of the first amine compound and second amine compound includes, is one, there is concern that the leakage (Js) increases since the molecular size is small.

The first amine compound includes, for example, at least two tertiary amino groups including heterocycles. The second amine compound includes, for example, at least two tertiary amino groups including heterocycles. When the first amine compound or the second amine compound includes tertiary amino groups including heterocycles, the solute loss at a time of performing forward osmosis (FO) can be made less than in the case where the first amine compound or the second amine compound does not include tertiary amino groups including heterocycles.

There is a tendency that the first amine compound, the C/N ratio in one molecule of which is in the range of 7 or more to 9 or less, has a higher separation ratio from water than the second amine compound the C/N ratio of which is in the range of 5 or more to less than 7. In other words, if the C/N ratio of an amine compound is increased, the solubility of the amine compound after absorption of carbon dioxide in water can be made higher than the solubility of the amine compound after release of carbon dioxide in water. For example, as described above, the difference between these solubilities can be increased four times or more.

On the other hand, there is a tendency that the first amine compound, in which the C/N ratio is relatively high, has a lower polarity conversion rate than the second amine compound. By contrast, since the second amine compound has a lower C/N ratio than the first amine compound, the second amine compound has an excellent polarity conversion rate, although the separation ratio tends to be lower.

The separation ratio (%) is defined as a percentage by Formula (A) below.

$$100-(C_1 \times V_1)/(C_2 \times V_2) \times 100 \qquad (A).$$

In Formula (A), $C_1$ represents an amine compound concentration in a water phase after phase separation, $V_1$ represents a volume of the water phase after phase separation, $C_2$ represents an amine compound concentration in a homogeneous solution, and $V_2$ represents a volume of the homogeneous solution.

In the case of the working medium including an amine compound with an excellent separation ratio, $C_1$ (the amine compound concentration in the water phase after phase separation) is low. In this case, the separation ratio calculated by Formula (A) is high. On the other hand, in the case of the working medium including an amine compound with a low separation ratio, $C_1$ (the amine compound concentration in the water phase after phase separation) is high. In this case, the separation ratio calculated by Formula (A) is low.

The working medium of the embodiment includes both the first amine compound with an excellent separation ratio, and the second amine compound with an excellent polarity conversion rate. The working medium including both has an excellent separability from water, and can achieve a high polarity conversion rate.

<Measuring Method of Separation Ratio>

A measuring method of a separation ratio of an amine compound that is a target will be described. The amine compound that is the target may be one kind of amine compound, or a mixture of two or more kinds of amine compounds. For example, the amine compound that is the target is a mixture of the first amine compound and second amine compound according to the embodiment.

In a glass container, 20 g of an amine compound solution that is a target and 40 g of pure water are mixed, and ultrasonic treatment is performed for one hour in an ultrasonic cleaner. Thereafter, the resultant is left to stand for 12 hours. Thereby, the mixture of the amine compound solution and pure water is typically separated into a water phase and an amine solution phase. The water phase obtained by the separation is sampled for total organic carbon (TOC) measurement, and filtered by a 0.45 μm cellulose filter. Then, the filtrate is diluted 100 times to 1,000 times. The carbon and nitrogen concentration of the diluted liquid is measured by TOC measuring instrument. Thus, the $C_1$ (the amine compound concentration in the water phase after phase separation) in the above Formula (A) can be measured.

Next, carbon dioxide from a liquefied carbon dioxide cylinder is bubbled in the mixture liquid at a flow rate of 3 L/min. A Kinoshita-type glass cylinder filter G3 is used for a supply port. A mixture, which was made homogeneous (transparent) by bubbling of carbon dioxide, is sampled, and the carbon and nitrogen concentration of the liquid diluted 10,000 times is measured by TOC measuring instrument. Thus, the $C_2$ (the amine compound concentration in the homogeneous solution) in the above Formula (A) can be measured. From the obtained result, the separation ratio can be determined according to Formula (A).

<Measuring Method of Time Needed for Polarity Conversion>

As regards an amine compound that is a target, a measuring method of time needed for polarity conversion will be described.

To begin with, an amine compound in an amount of 4 ml, which is a target, is prepared. When the amine compound that is the target is a mixture of two or more kinds of amine compounds, these amine compounds are mixed at a predetermined ratio, and the amine compound is prepared such that the total amount becomes 4 ml. Water in an amount of 8 ml is added to the prepared amine compound. Using a Kinoshita-type glass ball filter G3, a carbon dioxide gas is bubbled in the obtained mixture at a flow rate of 0.5 L/min. Visually judging that the mixture has become a solution of one phase, the time from when the bubbling was started to when the mixture has become the solution of one phase is set as a time (min) that is needed for polarity conversion.

If the C/N ratio of the first amine compound exceeds 9, there is a possibility that the first amine compound is not dissolved in water even if carbon dioxide is introduced into the working medium. As a result, since it becomes difficult to increase the osmotic pressure of the working medium, it becomes undesirably difficult to extract water from the water to be treated into the working medium. The C/N ratio of the first amine compound may be within a range of 7 or more to 8 or less. In addition, compounds included in the range of the first amine compound are different with respect to the polarity conversion rate, separation ratio, separation rate, FO capability, or other handling properties, depending on their structures. Thus, even between first amine compounds, at least one of the polarity conversion rate, separation ratio, separation rate, FO capability, or other handling properties is different.

If the C/N ratio of the second amine compound is less than 5, the second amine compound becomes easily dissolvable in water, and phase separation does not easily occur when the working medium is concentrated. Specifically, the separation ratio is low since the amine compound concentration (second amine compound concentration) in the water phase after phase separation increases. The C/N ratio of the second amine compound may be in a range of 5.6 or more to less than 7, or may be in a range of 6 or more to less than 7. In addition, compounds included in the range of the second amine compound are different with respect to the polarity conversion rate, separation ratio, separation rate, FO capability, or other handling properties, depending on their structures. Thus, even between second amine compounds, at least one of the polarity conversion rate, separation ratio, separation rate, FO capability, or other handling properties is different.

The ratio (M1/M2) of the mass (M1) of the first amine compound to the mass (M2) of the second amine compound in the working medium is, for example, in a range of 0.1 to 10, and preferably in a range of 0.65 to 6. If the ratio (M1/M2) is too high, the hydrophobic property of the working medium increases, and the contact efficiency with water decreases, and thus the protonation of the amine compound and the generation of the bicarbonate ion become difficult to occur. That is, since the polarity conversion rate decreases, the water treatment efficiency lowers. On the other hand, if the ratio (M1/M2) is too low, there is a possibility that the separation ratio lowers.

The mass percent concentration of the first amine compound in the working medium is, for example, in a range of 5% by mass to 70% by mass. The mass percent concentration of the second amine compound in the working medium is, for example, in a range of 5% by mass to 70% by mass.

The ratio of the total mass of the first amine compound and second amine compound to the working medium is, for example, in a range of 10% by mass to 70% by mass, and preferably in a range of 25% by mass to 60% by mass. If this ratio is too low, the osmotic pressure of the working medium is low, and there is a tendency that water does not easily move from the water to be treated. If the ratio is too high, the viscosity of the working medium becomes too high, although the osmotic pressure is high, and there is a tendency that the handling is difficult.

<Identification of the First Amine Compound and Second Amine Compound in the Working Medium, and Mixing Ratio Measurement>

By gas chromatography-mass spectrometry (GC/MS), the first amine compound and second amine compound, which the working medium includes, can be identified, and the mixing ratio thereof can be measured.

GC/MS is executed on the working medium of the measurement target, and an amine compound included in the working medium can be identified from a retention time and a mass spectrum. When the working medium includes a plurality of kinds of amine compounds, calibration curves of the identified compounds are created, and the mixing ratio can be confirmed by using the area value and calibration curves of the chromatograph.

The first amine compound is, for example, a tertiary amine compound expressed by any one of Formulae 1 to 4 below. In Formulae 1-4, X is a linear alkyl chain having a carbon number of 1 to 5. In each of Formulae 1 to 4, a substituent R ($R_1$~$R_{30}$) and X may be selected such that the C/N ratio in the Formula falls within a range of 7 or more to 9 or less.

In Formula 1 below, for example, two of $R_1$ to $R_8$ are methyl groups and the others are hydrogen, or four of $R_1$ to $R_8$ are methyl groups and the others are hydrogen, or two of $R_1$ to $R_8$ are ethyl groups and the others are hydrogen.

In Formula 2 below, for example, two of $R_9$ to $R_{18}$ are methyl groups and the others are hydrogen, or two of $R_9$ to $R_{18}$ are ethyl groups and the others are hydrogen, or four of $R_9$ to $R_{18}$ are methyl groups and the others are hydrogen, or all of $R_9$ to $R_{18}$ are hydrogen.

In Formula 3 below, for example, two of $R_{19}$ to $R_{30}$ are methyl groups and the others are hydrogen, or all of $R_{19}$ to $R_{30}$ are hydrogen.

[Chem. 1]

Formula 1

[Chem. 2]

Formula 2

[Chem. 3]

Formula 3

[Chem. 4]

Formula 4

The second amine compound is, for example, a tertiary amine compound expressed by Formula 5 or 6 below. In Formulae 5 and 6, X is a linear alkyl chain having a carbon number of 1 to 5. In Formula 5 or 6, a substituent R ($R_{31}$~$R_{38}$) and X may be selected such that the C/N ratio in the Formula falls within a range of 5 or more to less than 7.

In Formula 5 below, for example, two of $R_{31}$ to $R_{38}$ are methyl groups and the others are hydrogen.

[Chem. 5]

Formula 5

[Chem. 6]

Formula 6

In the above Formulae 1-6, the carbon number of X is preferably 3 or 4. In this case, since the pKa value of nitrogen included in the heterocycle becomes such a value that carbon dioxide is easily releases, there is an advantage that the polarity conversion rate increases. The carbon number of X is more preferably 3.

The molecular mass of the first amine compound is, for example, in a range of 230 g/mol to 300 g/mol. The molecular mass of the second amine compound is, for example, in a range of 200 g/mol to 230 g/mol.

The heterocycle included in each of the first amine compound and second amine compound is preferably a six-membered ring. The six-membered ring has no distortion of a ring, and the compound itself has high stability, and it is considered that a degraded impurity is hardly produced and a long-time use is possible.

A plurality of heterocycles included in the first amine compound may be rings of mutually different carbon numbers. For example, the first amine compound may include a heterocycle of a six-membered ring, and a heterocycle of a five-membered ring. Similarly, heterocycles included in the second amine compound may be rings of mutually different carbon numbers.

When the first amine compound or second amine compound includes a linear carbon chain as a substituent of a heterocycle, bubbling or the like tends to easily occur during water treatment as the carbon chain is longer. Therefore, if the carbon chain is long, there is a possibility that handling becomes difficult at a time of forward osmosis and at a time of phase separation, and this is not preferable. Thus, the carbon number of the linear carbon chain as the substituent of the heterocycle is preferably 1 or more, and 3 or less.

The first amine compound is, for example, at least one kind selected from the group consisting of 2-methyl-1-[4-(2-methylpyrrolidine-1-yl)butyl]pyrrolidine, 2-methyl-1-[5-(2-methylpyrrolidine-1-yl)pentyl]pyrrolidine, 1-[2-(2,3-dimethylpyrrolidine-1-yl)ethyl]-2,3-dimethylpyrrolidine, 1-[3-(2,3-dimethylpyrrolidine-1-yl)propyl]-2,3-dimethylpyrrolidine, 1-[4-(2,3-dimethylpyrrolidine-1-yl)butyl]-2,3-dimethylpyrrolidine, 1-[2-(2,5-dimethylpyrrolidine-1-yl)ethyl]-2,5-dimethylpyrrolidine, 1-[3-(2,5-dimethylpyrrolidine-1-yl)propyl]-2,5-dimethylpyrrolidine, 1-[4-(2,5-dimethylpyrrolidine-1-yl)butyl]-2,5-dimethylpyrrolidine, 2-ethyl-1-[4-(2-ethylpyrrolidine-1-yl)butyl]pyrrolidine, 2-ethyl-1-[3-(2-ethylpyrrolidine-1-yl)propyl]pyrrolidine, 2-ethyl-1-[2-(2-ethylpyrrolidine-1-yl)ethyl]pyrrolidine, 1-[4-(piperidine-1-yl)butyl]piperidine, 1-[5-(piperidine-1-yl)pentyl]piperidine, 4-methyl-1-[3-(4-methylpiperidine-1-yl)propyl]piperidine, 2-methyl-1-[3-(2-methylpiperidine-1-yl)propyl]piperidine, 1-[3-(2,6-dimethylpiperidine-1-yl)propyl]-2,6-dimethylpiperidine, 4-ethyl-1-[3-(4-ethylpiperidine-1-yl)propyl]piperidine, 1-[3-(2,4-dimethylpiperidine-1-yl)propyl]-2,4-dimethylpiperidine, 1-[3-(azepane-1-yl)propyl]azepane, 1-[2-(azepane-1-yl)ethyl]azepane, and 2-methyl-1-[2-(2-methylazepane-1-yl)ethyl]azepane.

The second amine compound is, for example, at least one kind selected from the group consisting of 3-methyl-1-[3-(3-methylpyrrolidine-1-yl)propyl]pyrrolidine, 2-methyl-1-[3-(2-methylpyrrolidine-1-yl)propyl]pyrrolidine, 1-[4-(pyrrolidine-1-yl)butyl]pyrrolidine, 1-[5-(pyrrolidine-1-yl)pentyl]pyrrolidine, 1-[3-(piperidine-1-yl)propyl]piperidine, and 1-[2-(piperidine-1-yl)ethyl]piperidine.

The working medium including the first amine compound and the second amine compound has such a property that when the concentration of carbon dioxide in the solution decreases, the working medium is phase-separated into a phase of a water system and a phase of an organic solvent system in which a solute is concentrated. When the concentration of carbon dioxide is high, the working medium is dissolved in the solution since the solubility in water is high. By recovering the phase of the organic solvent system in which the solute is concentrated, the aqueous solution in which the amine compounds are concentrated can economically be obtained. Since the working medium has a high phase separation ratio into the phase of the water system and the phase of the organic solvent system in which the solute is concentrated, water treatment can economically be performed. Since the working medium includes both of the first amine compound with a high phase separation ratio and the second amine compound with an excellent polarity conversion rate, the working medium has an excellent separability and can achieve a high polarity conversion rate.

Second Embodiment

Figure 2:
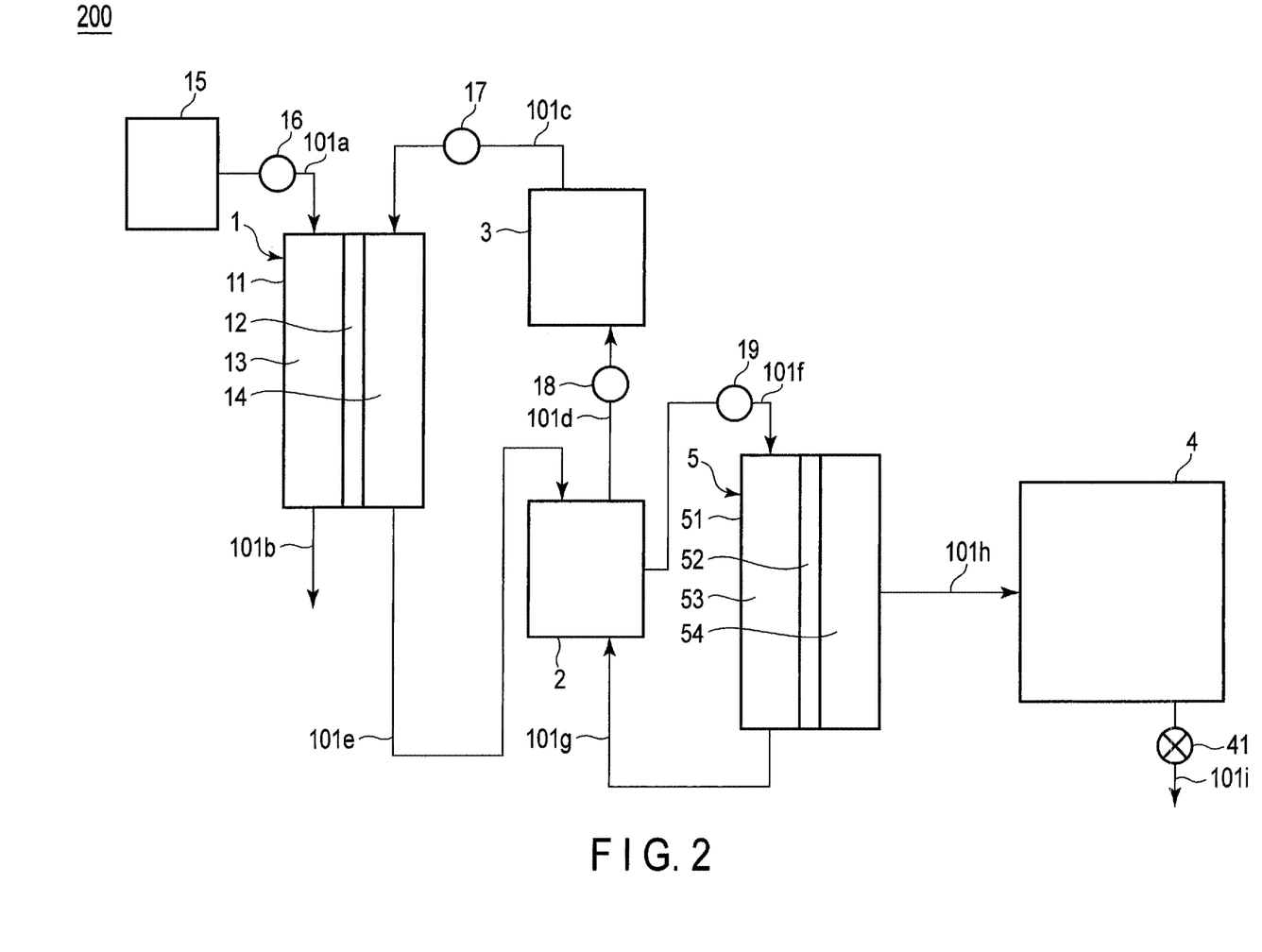
FIG. 2 is a view schematically illustrating another example of the water treatment system according to an embodiment.

Next, a desalination system according to a second embodiment, which is one example of the water treatment system, will be described. FIG. 2 is a schematic view of the desalination system according to the second embodiment. In the second embodiment, the first chamber 13, the water A to be treated, the second chamber 14, the working medium, and the osmosis membrane 12 are common to those in the first embodiment and the second embodiment. Since the second embodiment is a desalination system, the water to be treated is salt water. However, in the case of a concentration system or the like, the water to be treated is not limited to salt water, and the water to be treated described in the first embodiment is used.

A desalination system 200 is equipped with an osmotic pressure generator 1, a concentrator 2, a concentrated working medium tank 3, a purified water tank 4, and a reverse osmosis membrane separator 5. The osmotic pressure generator 1, the concentrator 2, the reverse osmosis membrane separator 5, and the concentrated working medium tank 3 are connected in this order to form a loop. The working medium (draw solution) to induce osmotic pressure circulates through this loop. In other words, the working medium circulates through the osmotic pressure generator 1, the concentrator 2, the reverse osmosis membrane separator 5, and the concentrated working medium tank 3 in this order. Incidentally, the upper, the lower, the left and the right are the directions illustrated in the drawings. For example, the concentrated working medium tank 3 is disposed on the upper side of the concentrator 2, and the osmotic pressure generator 1 is disposed on the left side of the reverse osmosis membrane separator 5.

A tank 15 of water to be treated is connected to the upper part of a first treatment container 11, in which the first chamber 13 is located, through a pipeline 101a. A first pump 16 is provided to the pipeline 101a. A pipeline 101b for discharging the concentrated water A to be treated is connected to the lower part of the first treatment container 11 in which the first chamber 13 is located.

The concentrator 2 is connected to the lower part of the first treatment container 11, in which the second chamber 14 is located, through a pipeline 101e. Furthermore, the concentrator 2 is connected to the concentrated working medium tank 3 through a pipeline 101d. A third pump 18 is provided to the pipeline 101d. The concentrator 2 is connected to the upper part of the second treatment container 51, in which the third chamber 53 is located, through a pipeline 101f. A fourth pump 19 is provided to the pipeline 101f. A pipeline 101g is provided to the lower part of the second treatment container 51 in which the third chamber 53 is located. The third chamber 53 is connected to the concentrator 2 through the pipeline 101g.

Figure 3:
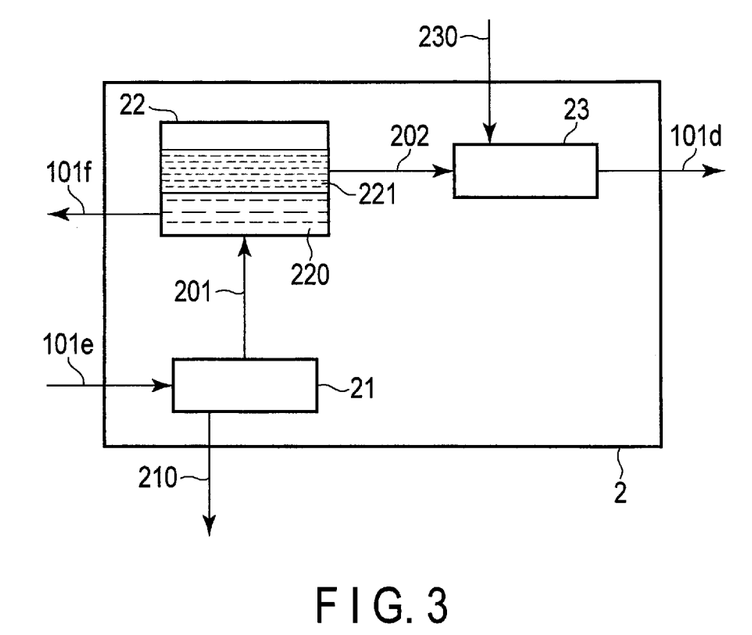
FIG. 3 is a view schematically illustrating a configuration of a concentrator according to an embodiment.

FIG. 3 is a view schematically illustrating a configuration of the concentrator 2. The concentrator 2 includes a carbondioxide releasing unit 21, a phase separating unit 22 and a carbondioxide introducing unit 23. The carbondioxide releasing unit 21 is connected to the second chamber 14, which the osmotic pressure generator 1 includes, through the pipeline 101e.

The phase separating unit 22 is connected to the carbondioxide releasing unit 21 through a pipeline 201. The working medium flowing in the phase separating unit 22, such as a centrifugal separator, is subjected to phase separation and is phase-separated into a water phase 220 and an amine solution phase (concentrated working medium phase) 221. The phase separating unit 22 is connected to the reverse osmosis membrane separator 5 by the pipeline 101f which is provided to be capable of recovering the water phase 220. The phase separating unit 22 is also connected to the carbondioxide introducing unit 23 by a pipeline 202 which is provided to be capable of recovering the concentrated working medium phase 221.

The carbondioxide introducing unit 23 is connected to the phase separating unit 22 through the pipeline 202. The carbondioxide introducing unit 23 is connected to the concentrated working medium tank 3 through the pipeline 101d.

The concentrated working medium tank 3 is connected to the upper part of the first treatment container 11, in which the second chamber 14 is located, through a pipeline 101c. A second pump 17 is provided to the pipeline 101c.

The purified water tank 4 is connected to the reverse osmosis membrane separator 5 through a pipeline 101h. A pipeline 101i for delivering the purified water in the purified water tank 4 to the outside and recovering the purified water is connected to the purified water tank 4. An on-off valve 41 is provided to the pipeline 101i. The on-off valve 41 is opened, for example, when the purified water in the purified water tank 4 exceeds a certain amount. In the case of omitting the reverse osmosis membrane separator 5, the concentrator 2 and the purified water tank 4 are connected to each other through the pipeline 101h.

The reverse osmosis membrane separator 5 is equipped with, for example, an airtight second treatment container 51. The second treatment container 51 is partitioned, for example, by a reverse osmosis membrane (RO membrane or NF membrane) 52, and a third chamber 53 is formed on the left side of the reverse osmosis membrane 52 and a fourth chamber 54 is formed on the right side thereof. The reverse osmosis membrane separator 5 is connected to the purified water tank 4 through the pipeline 101h. In the purified water tank 4, water (purified water), which is moved to the fourth chamber through the reverse osmosis membrane 52 when concentrating the working medium B, is accommodated.

Next, the operation of desalination by the desalination system 200 illustrated in FIG. 2 will be described.

The first pump 16 is driven to supply the water A to be treated (for example, seawater) from the tank 15 of water to be treated into the first chamber 13 of the osmotic pressure generator 1 through the pipeline 101a. Before and after the supply of seawater, the second pump 17 is driven to supply the concentrated working medium B from the concentrated working medium tank 3 into the second chamber 14 of the osmotic pressure generator 1 through the pipeline 101c. At this time, the solute concentration of the concentrated working medium B supplied to the second chamber 14 is higher than the salt concentration of the seawater supplied to the first chamber 13. Hence, an osmotic pressure difference is generated between the seawater in the first chamber 13 and the concentrated working medium B in the second chamber 14, and water in the seawater permeates through the osmosis membrane 12 and moves into the second chamber 14. The concentrated working medium B in the second chamber 14 is an aqueous solution containing the mixture of the first amine compound and second amine compound of the embodiment, and exhibits a high osmotic pressure inducing action. Hence, a high permeate flux is generated when water in the seawater in the first chamber 13 permeates through the osmosis membrane 12 and moves to the concentrated working medium B in the second chamber 14. As a result, it is possible to move a large amount of water in the seawater in the first chamber 13 to the concentrated working medium B in the second chamber 14 and thus to perform a highly efficient desalination treatment for extracting water (pure water) from salt water.

In the osmotic pressure generator 1, the seawater is discharged as concentrated seawater from the first chamber 13 through the pipeline 101b and the concentrated working medium B is diluted with the water moved, as the water in the seawater moves from the first chamber 13 to the concentrated working medium B in the second chamber 14. In a case in which the water treatment system of the embodiment performs the concentration of the water A to be treated, the wastewater discharged through the pipeline 101b is recovered. The diluted working medium B in the second chamber 14 is delivered to the concentrator 2 through the pipeline 101e.

The diluted working medium flows into the carbondioxide releasing unit 21 which the concentrator 2 includes, and, for example, with the diluted working medium being heated, carbon dioxide is released from the working medium. The released carbon dioxide is discharged through the pipeline 210. The discharged carbon dioxide may be re-used by the carbondioxide introducing unit 23.

The working medium, from which carbon dioxide is released, moves to the phase separating unit 22 through the pipeline 201, and is subjected to phase separation. Since the working medium of the embodiment includes both of the first amine compound and the second amine compound, phase separation quickly progresses, and the working medium has excellent separability. The water phase 220 recovered by liquid-liquid separation or solid-liquid separation moves to the third chamber 53 of the reverse osmosis membrane separator 5 through the pipeline 101f. The separately recovered concentrated working medium phase 221 moves to the carbondioxide introducing unit 23 through the pipeline 202.

In some cases, a small amount of the amine compound used as a solute is contained in the water moved to the third chamber 53, and this is concentrated in the reverse osmosis membrane separator 5. The water containing the concentrated amine compound flows into the carbondioxide introducing unit 23 through the pipeline 101g, and is mixed with the concentrated working medium phase 221. The purified water moved to the fourth chamber 54 in the reverse osmosis membrane separator 5 passes through the pipeline 101h and moves to the purified water tank 4.

In the carbondioxide introducing unit 23, carbon dioxide is introduced in the concentrated working medium phase 221 through a pipeline 230. Thereby, the working medium including the amine compounds is dissolved in water once again. At this time, the concentration of the working medium may be adjusted to a proper working medium concentration by, for example, adding water to the working medium if necessary. The concentrated working medium, which has become an amine aqueous solution having a proper concentration, is delivered from the carbondioxide introducing unit 23 to the concentrated working medium tank 3. The concentrated working medium in the concentrated working medium tank 3 is supplied into the second chamber 14 of the osmotic pressure generator 1 by driving the second pump 17, and is utilized in the desalination treatment for extracting water (pure water) from salt water as described above.

Meanwhile, the water (pure water) moved to the fourth chamber 54 is delivered to the purified water tank 4 through the pipeline 101h. When the amount of water in the purified water tank 4 exceeds a certain amount, the on-off valve 41 is opened to deliver the water to the outside through the pipeline 101i and to recover the water.

As described above, according to the desalination system of the embodiment, which relates to the water treatment system, pure water with high purity can be recovered in a short time.

Note that when the solute concentration in the working medium B is decreased by the desalination treatment, the solute can be added to the concentrated working medium tank 3 or the like.

Third Embodiment

Figure 4:
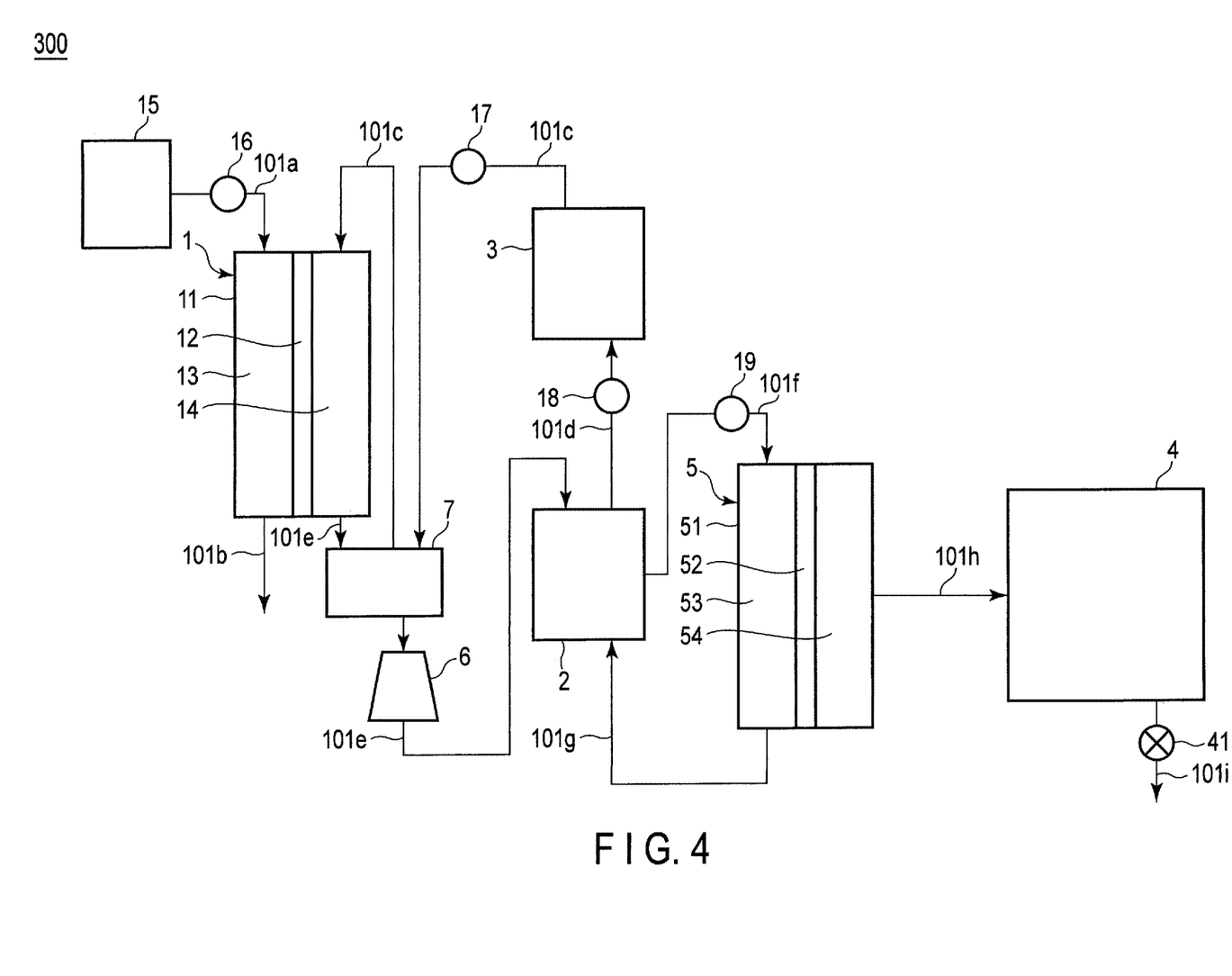
FIG. 4 is a view schematically illustrating another example of the water treatment system according to an embodiment.

Next, an osmotic power generation system 300 according to a third embodiment, which is another example of the water treatment system, will be described. FIG. 4 is a schematic diagram of the osmotic power generation system 300 according to the third embodiment. Incidentally, in FIG. 4, the same members as those in FIG. 3 are denoted by the same reference numerals, and the description thereon is omitted. The working medium to be used in the third embodiment is the working medium of the first embodiment.

The power generation system 300 includes an osmotic pressure generator 1 which generates a water flow, a concentrator 2, a concentrated working medium tank 3, a purified water tank 4, a reverse osmosis membrane separator 5, a body of rotation 6 which generates electricity by the water flow generated by the osmotic pressure generator 1, and a pressure exchanger 7.

In the osmotic power generation system 300, electricity can be generated by rotating the body of rotation 6 by the water flow which occurs by the movement of the water to be treated to the working medium B in the osmotic pressure generator 1.

Since the working medium of the embodiment exhibits a high osmotic pressure inducing action, it is possible to generate a high permeate flux when the water in the first chamber 13 permeates through the osmosis membrane 12 and moves to the working medium B in the second chamber 14. As a result, the working medium B containing water thus moved forms a water flow having a high pressure, and it is thus possible to rotate the body of rotation 6 at a high speed to generate electricity. Thus, according to the osmotic power generation system of the third embodiment, it is possible to efficiently generate electricity in a short time.

As the body of rotation 6, for example, a turbine or a water wheel can be used.

In the osmotic power generation system 300, the pressure exchanger 7 and the body of rotation 6 are provided to the pipeline 101e in the named order along the flow direction of the working medium B, the pipeline 101e being connected to the lower part (the exit side of the working medium B) of the first treatment container 11 in which the second chamber 14 of the osmotic pressure generator 1 is located. In addition, in the pipeline 101c which connects the concentrated working medium tank 3 to the upper part of the first treatment container 11 in which the second chamber 14 is located, the portion of the pipeline 101c on the downstream side of the second pump 17 in the flowing direction of the working medium B is connected to the upper part of the first treatment container 11 in which the second chamber 14 is located via the pressure exchanger 7.

In the osmotic pressure generator 1, the diluted working medium B having a flux generated when water has moved from the first chamber 13 to the second chamber 14 through the osmosis membrane 12 is allowed to flow out from the lower part of the first treatment container 11, in which the second chamber 14 is located, through the pipeline 101e provided with the pressure exchanger 7. During this time, the concentrated working medium B, which flows out from the concentrated working medium tank 3, flows through the pressure exchanger 7 via the pipeline 101c. Hence, pressure exchange occurs between the concentrated working medium B and the diluted working medium B flowing out from the second chamber 14 in the pressure exchanger 7, and the pressure of the concentrated working medium B increases, and the pressure of the diluted working medium flowing to the body of rotation 6 decreases.

The operation of power generation by the osmotic power generation system 300 illustrated in FIG. 4 will be described.

The first pump 16 is driven to supply water from the tank 15 of water to be treated into the first chamber 13 of the osmotic pressure generator 1 through the pipeline 101a. Before and after the supply of water, the second pump 17 is driven to supply the concentrated working medium B from the concentrated working medium tank 3 into the second chamber 14 of the osmotic pressure generator 1 through the pipeline 101c. The concentrated working medium B supplied to the second chamber 14 has a sufficiently higher concentration compared to the water that is only the solvent supplied to the first chamber 13. Hence, the osmotic pressure difference is generated between the water in the first chamber 13 and the concentrated working medium B in the second chamber 14, and the water permeates through the osmosis membrane 12 and moves into the second chamber 14. At this time, since the working medium of the embodiment is present in the second chamber 14, a high osmotic pressure inducing action is exhibited. Hence, a high permeate flux is generated when water in the first chamber 13 permeates through the osmosis membrane 12 and moves to the working medium B in the second chamber 14. As a result, a large amount of water in the first chamber 13 can move to the concentrated working medium B in the second chamber 14, and a diluted working medium B which has a high pressure and is diluted with water is produced. Incidentally, the water in the first chamber 13 is discharged through the pipeline 101b.

In the pressure exchanger 7, pressure exchange is performed between the concentrated working medium B, which flows from the concentrated working medium tank 3 through the pipeline 101c, and the diluted working medium B, which has a high pressure and flows from the second chamber 14 through the pipeline 101e. Specifically, the pressure of the concentrated working medium B increases, and the pressure of the diluted working medium flowing to the body or rotation 6 decreases. As a result of the pressure exchange, the diluted working medium B having a proper pressure flows to the body of rotation 6 and efficiently rotates the body of rotation 6 to generate electricity. In addition, as a result of the pressure exchange, the concentrated working medium B having a proper pressure is supplied to the second chamber 14.

In the concentrator 2, like the second embodiment, carbon dioxide is released from the working medium, the working medium is phase-separated, and carbon dioxide is introduced in the working medium, and the working medium, which is the concentrated amine aqueous solution, is stored in the concentrated working medium tank 3.

Note that, in the osmotic power generation system 300 illustrated in FIG. 4, the pipeline 101b, which communicates with the outside from the first chamber 13, may be connected to the tank 15 of water to be treated to form a loop by the tank 15 of water to be treated, the pipeline 101a, the first chamber 13 of the osmotic pressure generator 1, and the pipeline 101b.

EXAMPLES

Hereinafter, Examples will be described.

Example 1

A forward osmosis test was performed as follows. The CTA-ES membrane manufactured by HTI Corporation was set in a FO cell serving as an osmotic pressure generator. This membrane is an FO membrane, one major surface of which is an active surface, and the other major surface of which is a support layer surface. Pure water was placed on the active surface side as water to be treated, and then the working medium was placed on the support layer surface side. The working medium included, as the first amine compound, 1,3-di(azepane-1-yl)propane with a C/N ratio of 7.5, and included, as the second amine compound, 1,3-di(N-piperidinyl)propane with a C/N ratio of 6.5. The content of the first amine compound in the working medium was 5% by mass, and the content of the second amine compound was 28% by mass. Therefore, the ratio (M1/M2) of the mass (M1) of the first amine compound to the mass (M2) of the second amine compound in the working medium was 0.2.

The structure of 1,3-di(azepane-1-yl)propane, another name of which is 1-[3-(azepane-1-yl)propyl]azepane, is shown below.

[Chem. 7]

The structure of 1,3-di(N-piperidinyl)propane, another name of which is 1-[3-(piperidine-1-yl)propyl]piperidine, is shown below.

[Chem. 8]

The working medium placed on the support layer surface side is in the state of an aqueous solution of amine as a sufficient amount of carbon dioxide has bubbled in the working medium in advance. The time when the working medium was completely placed was counted as 0 minute, and this state was left to stand for 20 minutes.

After the test, the weight of the liquid on the active surface side was measured, and the permeate flux (Jw) was calculated from the difference before and after the test by taking the specific gravity of the liquid as 1. In addition, the total organic carbon concentration in the liquid on the active surface side after the test was measured by using a total organic carbon meter to calculate the loss of solute (Js). From the results, the loss of solute (Js/Jw) to the permeate flux was calculated, and was 1.0 mml/1 or less.

In addition, according to the method described in the first embodiment, the separation ratio of the working medium and the time needed for polarity conversion were measured, and the separation ratio was 97.2% and the time needed for polarity conversion was 23 minutes. Here, the polarity conversion means that the working medium becomes an aqueous solution by introduction of carbon dioxide into the working medium.

Examples 2 to 5

Tests were conducted by the same method as described in Example 1, except that the content of the first amine compound and second amine compound in the working medium was changed.

Example 6

A test was conducted by the same method as described in Example 3, except that 1,3-di(3-methylpyrrolidine-1-yl)propane was used as the second amine compound.

The structure of 1,3-di(3-methylpyrrolidine-1-yl)propane, another name of which is 3-methyl-1-[3-(3-methylpyrrolidine-1-yl)propyl]pyrrolidine, is shown below.

[Chem. 9]

Example 7

A test was conducted by the same method as described in Example 1, except that 1,4-di(N-piperidinyl)butane was used as the first amine compound, and that the content of the first amine compound and second amine compound in the working medium was changed.

The structure of 1,4-di(N-piperidinyl)butane, another name of which is 1-[4-(piperidine-1-yl)butyl]piperidine, is shown below.

[Chem. 10]

Comparative Example 1

A test was conducted by the same method as described in Example 1, except that only 1,3-di(azepane-1-yl)propane corresponding to the first amine compound was used at a concentration of 33% by mass to the working medium. In other words, the working medium according to Comparative Example 1 did not include the second amine compound.

Comparative Example 2

A test was conducted by the same method as described in Example 1, except that only 1,3-di(N-piperidinyl)propane corresponding to the second amine compound was used at a concentration of 33% by mass to the working medium. In other words, the working medium according to Comparative Example 2 did not include the first amine compound.

Comparative Example 3

A test was conducted by the same method as described in Example 1, except that only 1,4-di(N-piperidinyl)butane corresponding to the first amine compound was used at a concentration of 33% by mass to the working medium. In other words, the working medium according to Comparative Example 3 did not include the second amine compound.

Comparative Example 4

A test was conducted by the same method as described in Example 1, except that only 1,3-di(3-methylpyrrolidine-1-yl)propane corresponding to the second amine compound was used at a concentration of 33% by mass to the working medium. In other words, the working medium according to Comparative Example 4 did not include the first amine compound.

The above results are summarized in Table 1 below.

TABLE 1

| | First amine compound (C/N ratio = 7 or more and 9 or | | | Second amine compound (C/N ratio = 5 or more and less than 7) | | | Ratio M1/M2 | Separation ratio (%) | Time needed for polarity conversion (min) | Js/Jw (mmol/l) |
|---|---|---|---|---|---|---|---|---|---|---|
| | Names of compounds | C/N ratio | Mass (%) | Names of compounds | C/N ratio | Mass (%) | | | | |
| Example 1 | 1,3-di(azepane-1-yl)propane | 7.5 | 5 | 1,3-di(N-piperidinyl)propane | 6.5 | 28 | 0.2 | 97.2 | 23 | ≤1.0 |
| Example 2 | 1,3-di(azepane-1-yl)propane | 7.5 | 10 | 1,3-di(N-piperidinyl)propane | 6.5 | 23 | 0.4 | 97.3 | 27 | |
| Example 3 | 1,3-di(azepane-1-yl)propane | 7.5 | 16.5 | 1,3-di(N-piperidinyl)propane | 6.5 | 16.5 | 1.0 | 97.2 | 24 | |
| Example 4 | 1,3-di(azepane-1-yl)propane | 7.5 | 20 | 1,3-di(N-piperidinyl)propane | 6.5 | 13 | 1.5 | 98.4 | 33 | |
| Example 5 | 1,3-di(azepane-1-yl)propane | 7.5 | 25 | 1,3-di(N-piperidinyl)propane | 6.5 | 8 | 3.1 | 98.6 | 42 | |
| Example 6 | 1,3-di(azepane-1-yl)propane | 7.5 | 16.5 | 1,3-di(3-methylpyrrolidine-1-yl)propane | 6.5 | 16.5 | 1.0 | 97.4 | 21 | |
| Example 7 | 1,4-di(N-piperidinyl)butane | 7 | 28 | 1,3-di(N-piperidinyl)propane | 6.5 | 5 | 5.6 | 98.7 | 22 | |
| Comparative Example 1 | 1,3-di(azepane-1-yl)propane | 7.5 | 33 | — | — | 0 | — | 99.6 | 82 | |
| Comparative Example 2 | — | — | 0 | 1,3-di(N-piperidinyl)propane | 6.5 | 33 | — | 91.9 | 21 | |
| Comparative Example 3 | 1,4-di(N-piperidinyl)butane | 7 | 33 | — | — | 0 | — | 97.0 | 30 | |
| Comparative Example 4 | — | — | 0 | 1,3-di(3-methylpyrrolidine-1-yl)propane | 6.5 | 33 | — | 92.0 | 20 | |

From Table 1, the following is understood.

In Examples 1 to 7 in which the working medium includes the first amine compound with the C/N ratio of 7 or more to 9 or less and the second amine compound with the C/N ratio of 5 or more to less than 7, the excellent separation ratio was exhibited, and the time needed for polarity conversion was short. In each of Examples 1 to 7, since Js/Jw was 1.0 mmol/l, it can be said that the loss of the working medium due to the forward osmosis treatment was sufficiently low. From this, it can be estimated that water treatment can be repeatedly performed at low cost.

In Examples 4, 5 and 7 in which the ratio M1/M2 is 1.5 or more, the excellent separation ratio was successfully achieved. In particular, in Example 7 in which each of the first amine compound and second amine compound includes two heterocycles of six-membered rings, the time needed for polarity conversion was short, in addition to the excellent separation ratio.

Examples 1 to 6, in which 1,3-di(azepane-1-yl)propane is included as the first amine compound, is compared with Comparative Example 1. In Examples 1 to 6, compared to Comparative Example 1, the separation ratio was slightly lower, but the time needed for polarity conversion was remarkably shorter.

On the other hand, Examples 1 to 5 and 7, in which 1,3-di(N-piperidinyl)propane is included as the second amine compound, is compared with Comparative Example 2. In Comparative Example 2, there was a tendency that the polarity conversion rate is excellent, but the separation ratio is poor. In Examples 1 to 5 and 7, the separation ratio was remarkably improved, without greatly lowering the polarity conversion rate.

In addition, Example 7, in which 1,4-di(N-piperidinyl)butane is included as the first amine compound, is compared with Comparative Example 3. Compared to Comparative Example 3, in Example 7 in which the second amine compound is further included, not only the separation ratio was improved, but also the time needed for polarity conversion was decreased.

Further, Example 6, in which 1,3-di(3-methylpyrrolidine-1-yl)propane is included as the second amine compound, is compared with Comparative Example 4. Compared to Comparative Example 4, in Example 6 in which the first amine compound is further included, the separation ratio was remarkably improved while the polarity conversion rate is substantially maintained.

According to at least one of the above-described embodiments and Examples, a working medium is provided. The working medium includes a first amine compound and a second amine compound. The first amine compound is a tertiary amine compound which consists of a carbon atom, a nitrogen atom and a hydrogen atom, and in which the ratio (C/N ratio) of a carbon atom number to a nitrogen atom number included in one molecule is in a range of 7 or more to 9 or less, the tertiary amine compound including a plurality of heterocycles. The second amine compound is a tertiary amine compound which consists of a carbon atom, a nitrogen atom and a hydrogen atom, and in which the ratio (C/N ratio) of a carbon atom number to a nitrogen atom number included in one molecule is in a range of 5 or more to less than 7, the tertiary amine compound including a plurality of heterocycles.

Since the working medium includes both of the first amine compound with an excellent separation ratio and the second amine compound with an excellent polarity conversion rate, the working medium has an excellent separability from water and can achieve a high polarity conversion rate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A working medium comprising:
a first amine compound; and
a second amine compound,
wherein the first amine compound is a heterocyclic tertiary amine compound which consists of a carbon atom, a nitrogen atom and a hydrogen atom, and in which a ratio (C/N ratio) of a carbon atom number to a nitrogen atom number included in one molecule is from 7 to 9, the heterocyclic tertiary amine compound comprising a plurality of heterocycles,
the first amine compound comprises at least two tertiary amino groups comprising heterocycles, and
the second amine compound is a heterocyclic tertiary amine compound which consists of a carbon atom, a nitrogen atom and a hydrogen atom, and in which a ratio (C/N ratio) of a carbon atom number to a nitrogen atom number included in one molecule is in a range of 5 to less than 7, the heterocyclic tertiary amine compound comprising a plurality of heterocycles.

2. The working medium according to claim 1, wherein the second amine compound comprises at least two tertiary amino groups comprising heterocycles.

3. The working medium according to claim 1, wherein a ratio (M1/M2) of a mass (M1) of the first amine compound to a mass (M2) of the second amine compound is in a range of 0.5 to 10.

4. The working medium according to claim 1, wherein a ratio of a total mass of the first amine compound and the second amine compound to the working medium is in a range of 10% by mass to 70% by mass.

5. The working medium according to claim 1, wherein the first amine compound is expressed by any one of Formulae 1 to 4 below,
wherein
in Formula 1, two of $R_1$ to $R_8$ are methyl groups and the others are hydrogen, or four of $R_1$ to $R_8$ are methyl groups and the others are hydrogen, or two of $R_1$ to $R_8$ are ethyl groups and the others are hydrogen,
in Formula 2, two of $R_9$ to $R_{18}$ are methyl groups and the others are hydrogen, or two of $R_9$ to $R_{18}$ are ethyl groups and the others are hydrogen, or four of $R_9$ to $R_{18}$ are methyl groups and the others are hydrogen, or all of $R_9$ to $R_{18}$ are hydrogen,
in Formula 3, two of $R_{19}$ to $R_{30}$ are methyl groups and the others are hydrogen, or all of $R_{19}$ to $R_{30}$ are hydrogen, and
in Formulae 1 to 4, X is a linear alkyl chain having a carbon number of 1 to b 5;

Formula 1

Formula 2

Formula 3

Formula 4

6. The working medium according to claim 1, wherein the second amine compound is expressed by Formula 5 or 6 below,
wherein
in Formula 5, two of $R_{31}$ to $R_{38}$ are methyl groups and the others are hydrogen, and
in Formulae 5 and 6, X is a linear alkyl chain having a carbon number of 1 to 5;

Formula 5

Formula 6

7. The working, medium according to claim 1, wherein the first amine compound is at least one selected from the group consisting of 2-methyl-1- [4-(2-methylpyrrolidine-1-yl)butyl]pyrrolidine, 2-methyl-1-[5-(2-methylpyrrolidine-1-yl)pentyl]pyrrolidine, 1-[2-(2,3-dimethylpyrrolidine-1-yl) ethyl]-2,3-dimethylpyrrolidine, 1-[3-(2,3-dimethylpyrrolidine-1-yl)propyl]-2,3-dimethylpyrrolidine, 1-[4-(2,3-dimethylpyrrolidine-1-yl)butyl]-2,3-dimethylpyrrolidine, 1-[2-(2,5-dimethylpyrrolidine-1-yl)ethyl]-2,5-dimethylpyrrolidine, 1[3-(2,5-dimethylpyrrolidine-1-yl)propyl]-2,5-dimethylpyrrolidine, 1-[4-(2,5-dimethylpyrrolidine-1-yl)butyl]-2,5-dimethylpyrrolidine, 2-ethyl-1-[4-(2-ethylpyrrolidine-1-yl)butyl]pyrrolidine, 2-ethyl-1-[3-(2-ethylpyrrolidine-1-yl)propyl]pyrrolidine, 2-ethyl-1-[2-(2-ethylpyrrolidine-1-yl)ethyl]pyrrolidine, 1-[4-(piperidine-1-yl)butyl]piperidine, 1-[5-(piperidine-1-yl)pentyl]piperidine, 4-methyl-1-[3-(4-methylpiperidine-1-yl)propyl]piperidine, 2-methyl-1-[3-(2-methylpiperidine-1-yl)propyl]piperidine, 1-[3-(2,6-dimethylpiperidine-1-yl)propyl]-2,6-dimetylpiperidine, 4-ethyl-1-[3-(4- ethylpiperidine-1-yl)propyl]piperidine, 1-[3-(2,4-dimethylpiperidine-1-yl)propyl]-2,4-dimethylpiperidine, 1-[3-(azepane-1-yl)propyl]azepane, 1-[2-(azepane-1-yl)ethyl]azepane, and 2-methyl-1-[2-(2-methylazepane-1-yl)ethyl]azepane.

8. The working medium according to claim 1, wherein the second amine compound is at least one selected from the group consisting of 3-methyl-1-[3-(3-methylpyrrolidine-1-yl)propyl]pyrrolidine, 2-methyl-1-[3-(2-methylpyrrolidine-1-yl)propyl]pyrrolidine, 1-[4-(pyrrolidine-1-yl)butyl]pyrrolidine, 1-[5-(pyrrolidine-1-yl)pentyl]pyrrolidine, 1-[3-(piperidine-1-yl)propyl]piperidine, and 1-[2-(piperidine-1-yl)ethyl]piperidine.

9. A water treatment system comprising:
an osmotic pressure generator; and
a concentrator,
the osmotic pressure generator comprising:
a first chamber configured to accommodate water to be treated;
a second chamber configured to accommodate a working medium and comprising the working medium;
an osmosis membrane configured to partition the first chamber and the second chamber;
a treatment container configured to accommodate the first chamber, the second chamber and the osmosis membrane, and
the concentrator comprising:
a carbon dioxide releasing unit configured to release carbon dioxide from the working medium;
a phase separating unit configured to phase-separate the working medium; and
carbon dioxide introducing unit configured to cause the working medium to absorb carbon dioxide,
wherein the water treatment system further comprises:
first inlet pipeline configured to introduce water to the first chamber;
a second inlet pipeline configured to introduce the working medium to the second chamber;
an outlet pipeline configured to deliver diluted working medium from the second chamber of the osmotic pressure generator to the concentrator,
and wherein the working medium comprises:
a first amine compound; and
a second amine compound,
wherein the first amine compound is a heterocyclic tertiary amine compound which consists of a carbon atom, a nitrogen atom and a hydrogen atom, and in which a ratio (C/N ratio) of a carbon atom number to a nitrogen atom number included in one molecule is from 7 to 9, the heterocyclic tertiary amine compound comprising a plurality of heterocycles,
the first amine compound comprises at least two tertiary amino groups comprising heterocycles, and
the second amine compound is a heterocyclic tertiary amine compound which consists of a carbon atom. a nitrogen atom and a hydrogen atom, and in which a ratio (C/N ratio) of a carbon atom number to a nitrogen atom number included in one molecule is in a range of 5 or more to less than 7, the heterocyclic tertiary amine compound comprising a plurality of heterocycles.

* * * * *